US006208629B1

(12) United States Patent
Jaszewski et al.

(10) Patent No.: US 6,208,629 B1
(45) Date of Patent: Mar. 27, 2001

(54) METHOD AND APPARATUS FOR ASSIGNING SPECTRUM OF A LOCAL AREA NETWORK

(75) Inventors: Gary M. Jaszewski, Los Gatos; David A. Fisher, Menlo Park; Richard C. Chambers, Cupertino, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/266,245

(22) Filed: Mar. 10, 1999

Related U.S. Application Data (62) Division of application No. 08/640,184, filed on Apr. 30, 1996.

(51) Int. Cl.[7] .................................................. H04Q 7/00
(52) U.S. Cl. ............................ 370/329; 455/63; 370/431
(58) Field of Search ..................................... 370/252, 328, 370/329, 431, 468, 522; 455/450, 67.1, 446, 447, 448, 63, 524, 67.3

(56) References Cited

U.S. PATENT DOCUMENTS

| | | | |
|---|---|---|---|
| 5,285,494 | * 2/1994 | Sprecher et al. ..................... | 455/423 |
| 5,734,646 | * 3/1998 | I et al. .................................. | 370/335 |
| 5,870,385 | * 2/1999 | Ahmadi et al. ....................... | 370/252 |
| 5,933,420 | * 8/1999 | Jaszewski et al. .................... | 370/329 |
| 6,128,498 | * 10/2000 | Benveniste ............................ | 455/450 |

* cited by examiner

Primary Examiner—Huy D. Vu
(74) Attorney, Agent, or Firm—David J. Weitz; Wilson Sonsini, Goodrich & Rosati (57) ABSTRACT

One embodiment of the invention includes assigning channels to a set of access points coupled to a network. The network includes a set of wireless network nodes. Each access point communicates, using one of the channels, to a subset of the wireless network nodes. Each channel corresponds to a different frequency range in the electromagnetic spectrum. The embodiment includes the following steps. At least a first access point of the set of access points transmits a plurality of messages. A measure of interference between access points communicating on a first channel is determined from the plurality of messages. A second set of channel assignments, that results in a lower amount of interference between access points communicating on the first channel, is determined. The second set of channel assignments is assigned to the set of access points. Thus, non-interfering frequency assignments for the access points can be determined.

4 Claims, 4 Drawing Sheets

METHOD AND APPARATUS FOR ASSIGNING SPECTRUM OF A LOCAL AREA NETWORK

RELATIONSHIP TO COPENDING APPLICATIONS

This application is a Division of application Ser. No. 08/640,184, filed Apr. 30, 1996, which application is incorporated herein by reference in its entirety.

THE BACKGROUND OF THE INVENTION

1. The Field of the Invention

This invention relates to the field of wireless local area networks (LANs). In particular, the invention relates to assigning spectrum to access points in a wireless LAN.

2. A Description of the Related Art

Computer networks supply data and services to the computers and devices connected to the network. Traditionally, the connection to the network has been through a wired medium such as coaxial cable, fiber optics, twisted pair, etc. However, there are a number of applications that benefit from a completely, or partially, mobile computer (or other device). Such computers connect to the network using wireless communications. Wireless communications rely on data transfers using radio transmitters and receivers.

A wireless LAN includes access points and wireless network nodes. The access points connect wireless network nodes to the wired part of the LAN or to some other wireless part of the LAN. An access point communicates, using wireless communications, with the wireless network nodes in that access point's communications area. Thus, an access point maintains a number of simultaneous wireless communications links with a number of wireless network nodes. The access points and the wireless network nodes include transceivers (transmitters and receivers) to establish and maintain the wireless communications links. The transceivers transmit and receive signals in the electromagnetic spectrum, for example, in the infrared spectrum, at 902 MHz or at 2.4 GHz.

The access points typically support multiple channels. This allows two or more access points, communicating on different channels, to have overlapping coverage areas. Different channels can be supported by access points in different ways. For example, Proxim, Inc. supplies a wireless LAN product line called RangeLAN2™. The RangeLAN2 uses frequency hopping spread spectrum communications. A RangeLAN2 transmitter hops from frequency to frequency while transmitting to a receiver. Different channels are supported by different, orthogonal, hopping sequences. Another technique is called direct sequence spread spectrum (DSSS) communications. DSSS breaks the electromagnetic spectrum into a number of sub-bands. Each sub-band corresponds to a different channel.

One of the problems with DSSS communications, or any communications technique where a channel corresponds to a specific part of spectrum, is that access points with overlapping coverage areas need to be assigned to different channels. If access points with overlapping coverage areas are not assigned to different channels, then the transmissions will interfere with each other. This leads to a need to assign different channels to the access points that have overlapping coverage areas.

To adjust for changes in the wireless communications environment, new access points may be added or access points may need to be moved. This may change the overlapping areas of the access points, possibly causing some access points to interfere with other access points. Thus, what is needed is a method and apparatus for displaying the amount of interference between access points and for generating a new set of channel assignments for the access points that will reduce, or eliminate, the interference of the access points.

A SUMMARY OF THE INVENTION

A method and apparatus for maintaining non-interfering frequency assignments of wireless-based computer networking products is described.

One embodiment of the invention includes assigning channels to a set of access points coupled to a network. The network includes a set of wireless network nodes. Each access point communicates, using one of the channels, to a subset of the wireless network nodes. Each channel corresponds to a different frequency range in the electromagnetic spectrum. The embodiment includes the following steps. At least a first access point of the set of access points transmits a plurality of messages. A measure of interference between access points communicating on a first channel is determined from the plurality of messages. A second set of channel assignments, that results in a lower amount of interference between access points communicating on the first channel, is determined. The second set of channel assignments is assigned to the set of access points. Thus, non-interfering frequency assignments for the access points can be determined.

In one embodiment, each access points transmits a message requesting all the access points that detect the message to reply. Each access point measures the strengths of the reply messages to determine the radio proximity of that access point's neighbors. The reply messages indicate to what degree other access points are directly interfering with a given access point's wireless communications, by communicating on the same channel as that access point. The reply messages also indicate which neighbors are transmitting on channels that are near the channel being used by an access point. The reply messages also indicate which neighbors can be detected by an access point but are assigned to channels that neither directly or nearly interfere. In one embodiment, the radio proximity information is tabulated by a network manager. The table indicates to what degree each access point is directly conflicting with any neighboring access points, given that access point's present channel assignment. The table also indicates near conflicts (neighbors communicating on near channels) and other signals detected for each access point.

In one embodiment, the radio proximity information is processed to reduce or eliminate direct conflicts and near conflicts; thereby, significantly improving the wireless communications of the network. In one embodiment, an iterative process is used to find better channel assignments by comparing any possible new channel assignments with the previous best (lowest amount of direct and/or near conflict) channel assignments.

In one embodiment, the new channel assignments are then displayed to the user with the radio proximities shown graphically. The user can then change any of these new assignments before the new assignments are transmitted to the access points.

Although many details have been included in the description and the figures, the invention is defined by the scope of the claims. Only limitations found in those claims apply to the invention.

A BRIEF DESCRIPTION OF THE DRAWINGS

The figures illustrate the invention by way of example, and not limitation. Like references indicate similar elements.

THE DESCRIPTION

A Wireless LAN

Figure 1:
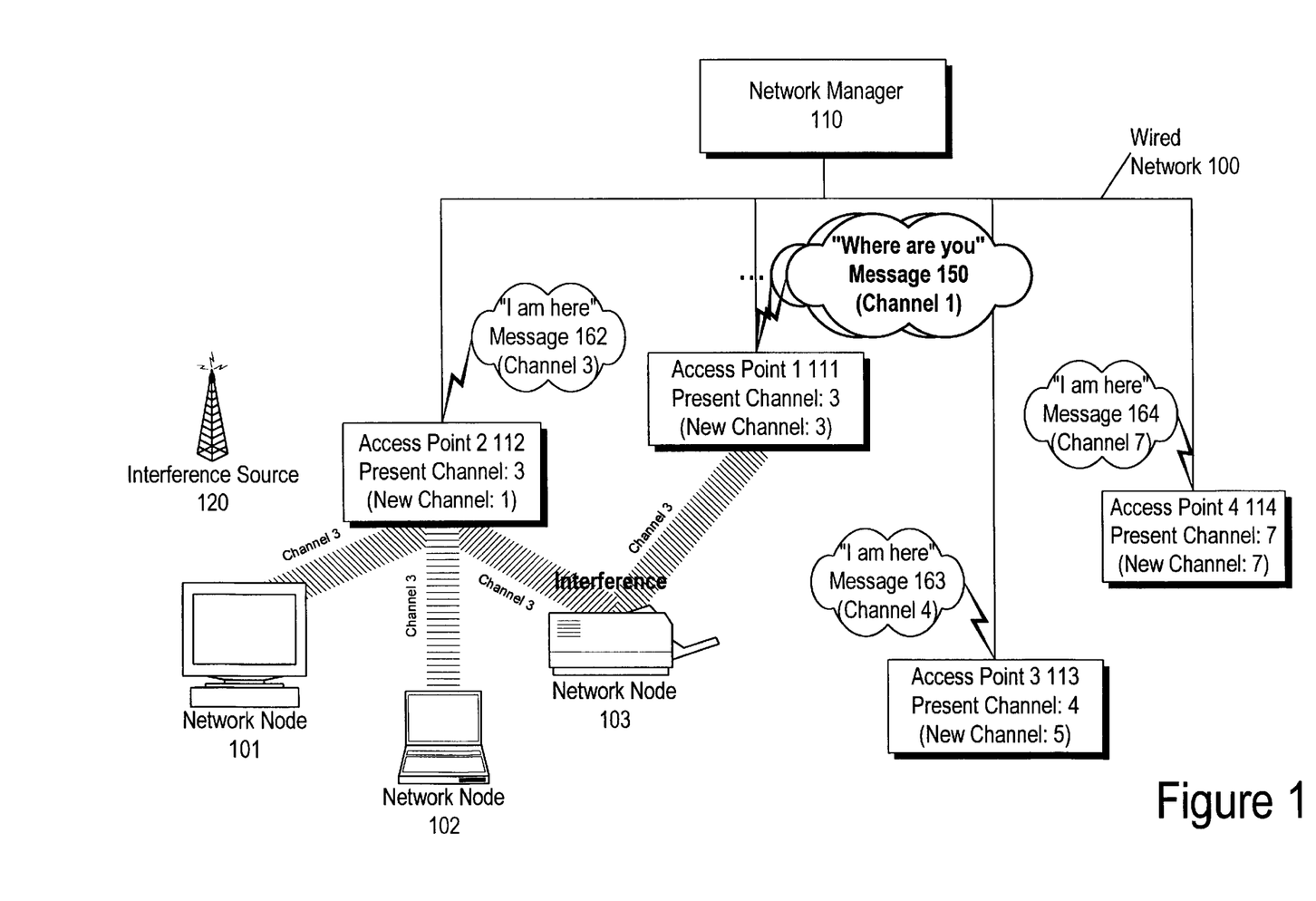
FIG. 1 illustrates a wireless local area network (LAN) determining the channel assignments for the access points in the LAN.

FIG. 1 illustrates a wireless local area network (LAN) determining the channel assignments for the access points in the LAN. The LAN of FIG. 1 is illustrative only and is not the only network in which one embodiment of the invention operates.

The wired network 100 includes: a wired media; a number of wireless access points (an access point 1 111, an access point 2 112, an access point 3 113 and an access point 4 114); and, a network manager 110. The wired media includes one or more of coaxial cable, twisted pair, fiber optics, and any other media that support wired communications. In one embodiment, the wired media is replaced by a wireless communications network (e.g., RangeLINK™ from Proxim, Inc.). The access points communicate with the network manager 110 over the wired media.

The network manager 110 includes a computer such as an IBM compatible PC, a Sun workstation, a Macintosh computer, or a specialized network management device. In any case, the network manager 110 includes a memory for storing information and a process for accessing the information and manipulating the information.

The access points communicate with a number of wireless network nodes (e.g., a network node 101, a network node 102, and a network node 103). Each access point and each wireless network node includes a transceiver. Each transceiver supports wireless communications. One embodiment of the access point 2 112 is described in the U.S. patent application Ser. No. 08/394,378, filed Feb. 24, 1995.

Each access point communicates with its set of wireless network nodes using a specific channel. In the example of FIG. 1, the access point 2 112 uses channel three, the access point 1 111 also uses channel three, the access point 3 113 uses channel four, and the access point 4 114 uses channel seven.

The following discussion relates to how the access point 2 112 communicates with the network node 101, the network node 102 and the network node 103. However, this discussion applies to any of the access points and any wireless network node. Importantly, the access point 2 112 communicates with the network node 101, the network node 102 and the network node 103, using a single channel (channel three). The channel corresponds to a specific portion of the electromagnetic spectrum. In this example, the access point 1 111 is also communicating on channel three. As the network node 103 can detect messages from both the access point 1 111 and the access point 2 112, the messages interfere with each other. The interference is undesirable.

When a new access point is added to the wireless network, an access point is moved, or a source of interference jams or degrades the quality of the communications from the access point to the wireless network nodes, one or more access points may have to change their channel. For example, in FIG. 1, assume that access point 1 111 has been added to the network and that an interference source 120 has begun jamming the communications channel used by the access point 2 112. Also assume that the same channel is being used by the access point 1 111 and the access point 2 112. One embodiment of the invention detects the interference between the two access points, notes the existence of the jamming from the interference source 120, and generates a new set of channel assignments for the access points that reduces the communications conflict due to the interference between the two access points and the jamming. The communications conflict includes a measure of the radio proximity of access points that communicate on the same, or a near, channel.

As noted, the invention also attempts to generate a set of channel assignments that reduces the amount of near conflict between two or more access points. A near conflict occurs when overlapping access points use channels that are near to each other in the electromagnetic spectrum. For example, if the access point 1 111 uses channel three, out of eleven possible channels, and the access point 2 112 uses channel four, then these two access points are said to be using two channels near each other. For better wireless communications performance, it is desirable to have the access points, in close radio proximity, use channels that are further apart than a single channel. For example, it is more desirable that access point 2 112 use channel one or some other channel further away from channel three in the electromagnetic spectrum.

Generally, to generate a new set of channel assignments, one embodiment of the invention first determines the amount of communications conflict with other sources for each of the access points for their present channels. The amount of communications conflict indicates the amount of interference, from other radio transmitters, experienced by a given access point for a given channel. Next, the amount of communications conflict for all the access points is tabulated. If possible, a new set of channel assignments is generated that results in a reduced amount of communications conflict. Finally, the new set of channel assignments are provided to the access points so that they can switch channels. Thus, changes in the wireless communications environment can be compensated for by one embodiment of the invention.

One of the first steps in determining the amount of communications conflict is to learn the neighbor access points for each access point. Each access point transmits a "Where are you" message 150 on each channel. The message 150 includes an identifier (e.g., a network address of the access point, or some unique identifier) of the transmitting access point. For example, the access point 1 111 transmits the message 150 on each channel.

In one embodiment, the message 150 is transmitted at a higher power than normal transmissions to the wireless network nodes. This is because it is possible that two access points cannot normally detect each other's presence at nominal signal output levels, but that a wireless network node, positioned to communicate with both access points, may be able to detect signals from both of those nodes. The message 150 includes an identifier identifying the source of the message 150.

The access points that detect the message 150 then reply with an "I am here" message (e.g., the access point 2 112 detected the message 150 and responds with an "I am here"

message 162; similarly a message 163 and a message 164 are transmitted by the access point 3 113 and the access point 4 114, respectively). The "I am here" message includes an identifier (e.g., a network address, or some unique identifier) of the transmitting access point of the "I am here" message. The "I am here" message is transmitted on the channel used to receive the "Where are you" message. Optionally, the "I am here" messages are sent at the increased power level. This helps ensure that transmitting access point of the "Where are you" message receives the "I am here" messages.

The transmitting access point of the "Where are you" message measures the received signal strength of the "I am here" messages. Thus, each access point learns the signal strength of its neighbors.

Optionally, each access point includes a device for detecting interference on one or more channels. Each access point then also includes an amount of interference for each channel.

The network manager 1 10 collects the received signal strengths information to determine the amount of communications conflict among the access points using their present channel assignments. The network manager 110 then generates a set of new channel assignments that results in a reduced amount of communications conflict among the access points. In the example of FIG. 1, for the new channel assignments, the access point 2 112 is assigned channel one, the access point 1 111 keeps channel three, the access point 3 113 is assigned channel five, and the access point 4 114 keeps channel seven. The network node 103 can now communicate with the access point 2 112 without interference from the access point 1 111.

In one embodiment, the network manager 110 generates the set of new channel assignments so that only a few access points need change their channels. By minimizing the number of access points that need change their channel, any disruptions of communications between the access points and the wireless network nodes are minimized.

New Channel Assignments

Figure 2:
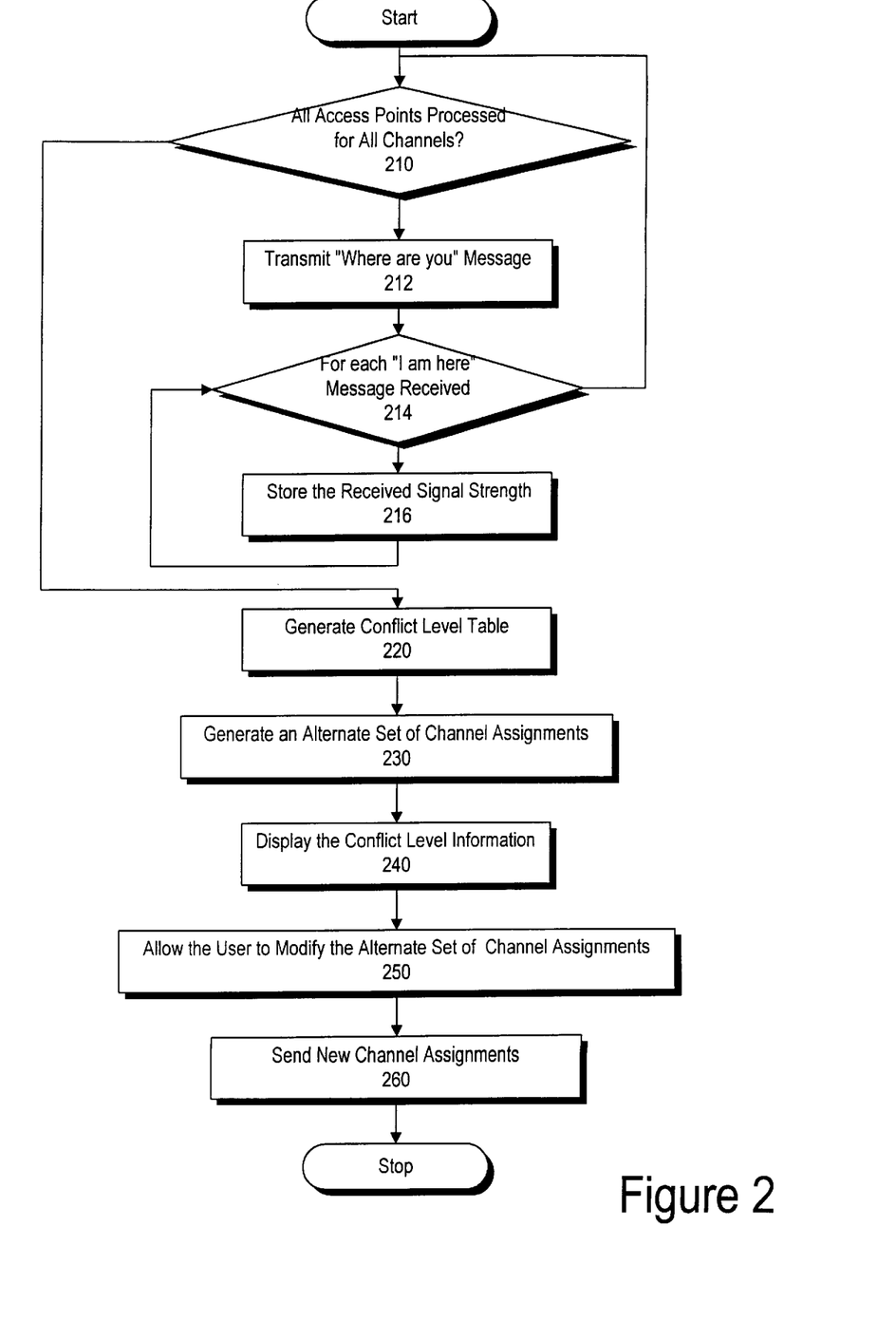
FIG. 2 illustrates determining and assigning a new set of channel assignments for the access points in the LAN of FIG. 1.

FIG. 2 illustrates determining and assigning a new set of channel assignments for the access points in the LAN of FIG. 1. First information is obtained about the neighboring access points and then the new set of channel assignments is generated and broadcast. Step 210 through step 216 ensure that each access point transmits a "Where are you" message 150 and measures the signal strength of any received "I am here" messages. At step 210, a test is made to determine whether each access point in the LAN has sent the "Where are you" messages. In one embodiment, the network manager 110 sends a message to each access point, in turn, to execute step 212 through step 216. The network manager 110 then performs step 220 through step 260.

In one embodiment, prior to transmitting the "Where are you" messages 150, an access point halts communications with its wireless network nodes. This is because the "Where are you" messages 150 are transmitted for each channel. As the network nodes are communicating with the access point on a specific channel, and the access point needs to transmit messages on different channels, if the communications were not halted, the network nodes would lose contact with the access point as it switched channels.

At step 212, a given access point transmits a "Where are you" message 150 on a first channel. As noted above, the "Where are you" message 150 includes an identifier identifying the transmitting access point. For example, the message 150 from the access point 1 111 includes the address of the access point 1 111. Step 212 is executed for each channel for each access point.

In response to the "Where are you" message 150, any neighbor access points that detect the message, respond with their own "I am here" message. For example, assume that the access point 1 111 transmits a "Where are you" message 150 on channel three and only the access point 2 112 is communicating on channel three, then only the access point 2 112 will transmit an "I am here" message (assuming that the access point 2 112 detected the "Where are you" message 150). While looping through step 210 through step 216, step 212 is executed for each channel for the access point 1 111, resulting in three "I am here" messages 162, 163 and 164 being sent by the other access points.

At step 214 and step 216, the given access point receives and processes any "I am here" messages from any neighbor access points. At step 214, a test is made to ensure that all the received "I am here" messages are processed in response to a given "Where are you" message 150 on a given channel. In one embodiment, an access point uses a timeout to determine if all of the "I am here" messages have been received. For example, when the access point 1 111 transmits the "Where are you" message 150, the access point 1 111 starts a counter. The access point 1 111 then begins processing any received "I am here" messages. The access point 1 111 then stops listening for "I am here" messages when the counter reaches a predetermined value (e.g., after thirty seconds).

At step 216, the transmitting access point of the "Where are you" message 150 tests the received signal strength of the "I am here" messages on the given channel. The access point then saves the received signal strength, and the identifier of the sender of the "I am here" message, for each received "I am here" message. In one embodiment, the access point also saves the channel used by the sender of the "I am here" message. Each access point maintains a local neighbors table that holds this information.

For example, as step 214 and step 216 are executed, during the step 210 through step 216 loop for each channel for the access point 1 111, the following information is stored by the access point 1 111: access point 2 112 detected at signal strength eight on channel three; access point 3 113 detected at signal strength two on channel four, and access point 4 114 detected at signal strength five on channel seven.

Optionally, before, or after step 212, a step can be included for detecting any interference from outside sources for a given channel of a given access point. For example, if the access point 2 112 detects interference on channels one through five as a result of the interference source 120, then this information is also stored by the access point 2 112. During the generating of the new channel assignments, these jammed channels will be excluded as possible channels for the access point 2 112.

After step 210 through step 216 have been completed for each channel for each access point, then step 220 through step 260 are performed. At step 220, a conflict level table (or conflict table) is generated from all the local neighbors tables. The conflict table defines, for each access point, the present channel used, the amount of direct conflict, the amount of near conflict and the amount of the other signals detected. The amount of direct conflict corresponds to the total signal strength of "I am here" messages received by an access point on the present channel of that access point. The amount of near conflict corresponds to the total signal strength of "I am here" messages received by an access point on channels near to that access point's present channel. The amount of other signals detected corresponds to the total signal strength of "I am here" messages received by an access point on channels that are neither the present channel nor the near channels.

In one embodiment, before determining the total received signal strength, an average detected signal strength is first determined. The average detected signal strength corresponds to the average of the received signal strength of a first message from a first access point to a second access point and the received signal strength of a second message from the second access point to the first access point. For example, if the access point 1 111 receives the "I am here" message 162, from access point 2 112, at a signal strength of eight, and the access point 2 112 receives an "I am here" message, from access point 1 111, at a signal strength of nine, then the average detected signal strength is eight and one half.

At step 230, a new (or recommended) set of channel assignments are generated from the conflict table. The new set of channel assignments results in a lower amount of conflict in the conflict table. In some cases, a new set of channel assignments that result in a lower amount of conflict may not exist. In such cases, the network administrator (LAN administrator, or some other user) is notified of this fact.

A number of techniques are used in step 230 to determine an alternative set of channel assignments. For example, in one embodiment, the conflict table is sorted, first on direct conflict values, then on near conflict values. Next, the access point with the highest conflict value is assigned to a different channel. The conflict table is then recomputed to determine whether the new channel assignment results in no direct conflict for the access point. If not, then a different channel is selected for the access point. The above steps are repeated until a channel assignment for the access point is found that results in no direct conflict. The new table is then resorted and the above steps are repeated until all the access points have zero direct conflict values. In one embodiment, the above steps are repeated until the access points have a minimal amount of direct conflict. In one embodiment, after the direct conflicts are reduced, the channel assignments are altered to result in a lower amount of near conflict. In one embodiment, the channel assignments are altered to result in as few channel reassignments as possible while still eliminating all of the direct conflicts.

In one embodiment, a number of conflict tables are created. Each conflict table includes only those access points that are within radio proximity (i.e., have a non-zero value for the direct conflict, near conflict or other signal detection) of at least one other access point in the table. Each table is then processed separately to generate a new set of channel assignments for the access points in that table. Generating a number of conflict tables can greatly reduce the number of calculations that need to be performed to generate the new channel assignments. This is because determining the new channel assignments becomes significantly more difficult for each additionally access point in a table (i.e. the new channel assignments problem is greater than O(n)).

In one embodiment, the step 230 only generates a set of new channel assignments that results in no direct conflicts. This reduces the number of access points that will have to change their channel, thus, reducing the number of wireless network nodes that will have to change their channels and thereby reducing the impact on the network's performance.

If the interference sources are also included in the new channel assignment generation process, then a set of available channels is first determined for each access point. The set of available channels represents all the channels that are not being jammed by an interference source 120 for a given access point. Note, that in one embodiment, the LAN administrator can identify a set of unusable channels for an access point. This is particularly useful where the interference source 120 is intermittent. For example, if the interference source 120 was a microwave oven that jams channels three through five of the access point 1 111, then the LAN administrator can set the unusable channels for the access point 1 111 to be channels three through five.

Figure 4:
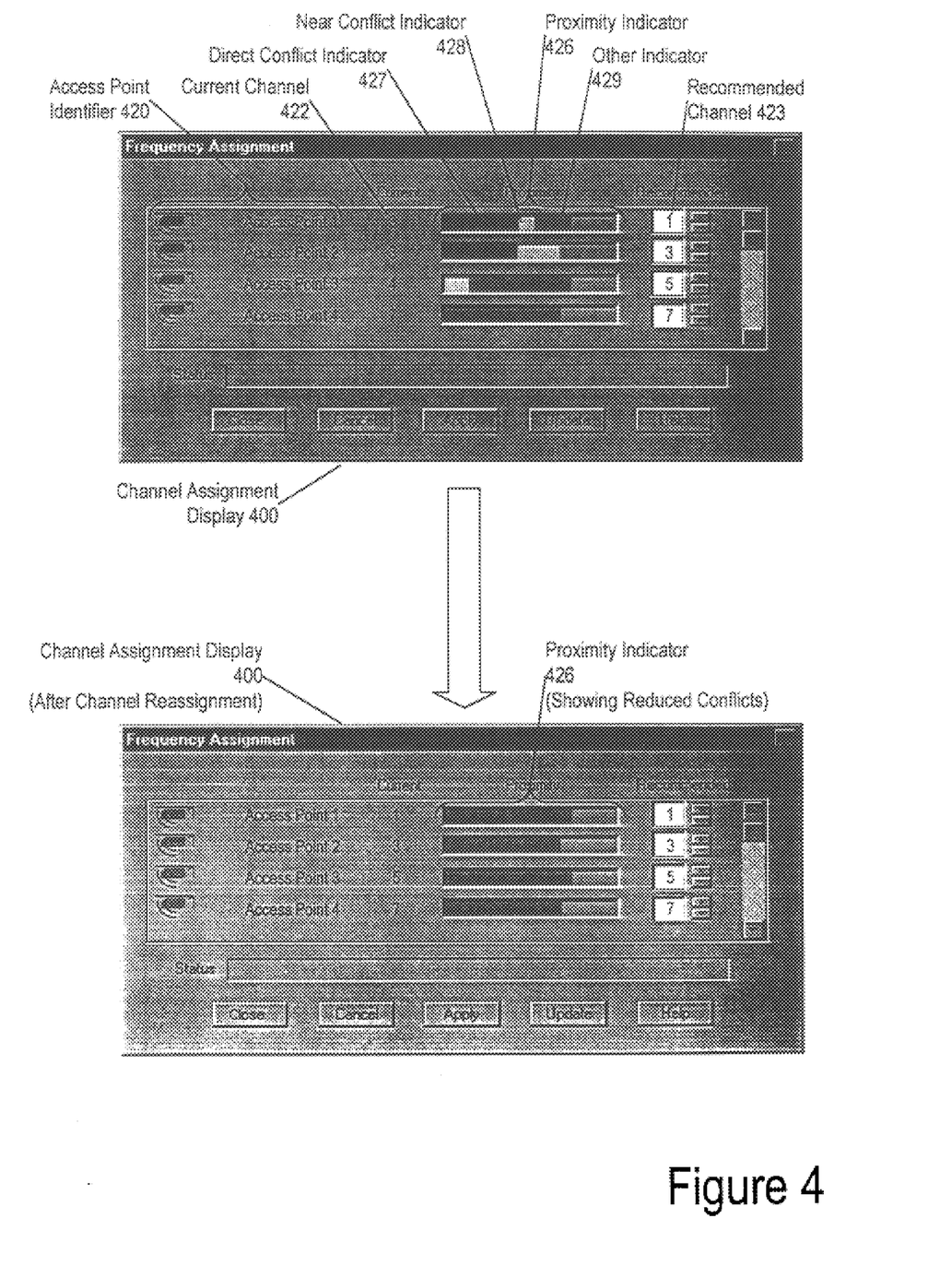
FIG. 4 illustrates a graphical user interface for displaying the levels of conflict between access points and for allowing a user to reassign channel assignments.

At step 240, the conflict level information, from the conflict table, is displayed. In one embodiment, the conflict level information is displayed on the network manager's 110 display as shown in FIG. 4.

At step 250, the network administrator can modify the new channel assignments. This provides the network administrator with flexibility. A network administrator may wish a particular access point to be assigned to a particular channel, may know that a new access point will be added to the network and/or may want to reserve a channel for that access point, or for some other reason change the new channel assignments.

At step 260, the network manager 110 sends the new channel assignments to the access points. The access points that have new channels then transmit the new channel to their wireless network nodes. The wireless network nodes and the access points then begin communicating on the new channels. Optionally, step 240 and step 250 are not performed, resulting in an automatic reassignment of the channels.

As an alternative to the above method, rather than measuring the signal strength of the received "I am here" messages, each access point measures the received strength of the "Where are you" messages 150. A conflict table is generated from this information. This results in a reduced number of messages that need be sent because "I am here" messages are not transmitted.

As another alternative to the above method, the neighbor table information is not stored in the access points. Each time an "I am here" message (or a "Where are you" message 150) is received at an access point, that access point transmits the message sender's identifier, the message receiver's identifier, the received signal strength and the channel to the network manager 110, or back to the sender access point, over the wired network 100. The network manager 110 then builds the conflict level table from all of these messages, or the access point generates a local neighbors table. Transmitting the information to the network manager has the advantage of reducing the computing power and the memory requirements of the access points.

In one embodiment, the network administrator can select a subset of all the access points in which to apply the method of FIG. 2. This feature provides the network administrator with added flexibility in managing the network. For example, assume that the access points of FIG. 1 are but a small number of the access points in the wired network 100, but that the access points of FIG. 1 are physically located far from the other access points. In this case, the network administrator can indicate that only a select few of the access points should be evaluated for new channel assignments.

The method of FIG. 2 can be performed anytime the wireless communications environment changes. The method can also be executed on a regular basis, for example, once a week, or daily.

Conflict Table Creation and Use

Figure 3:
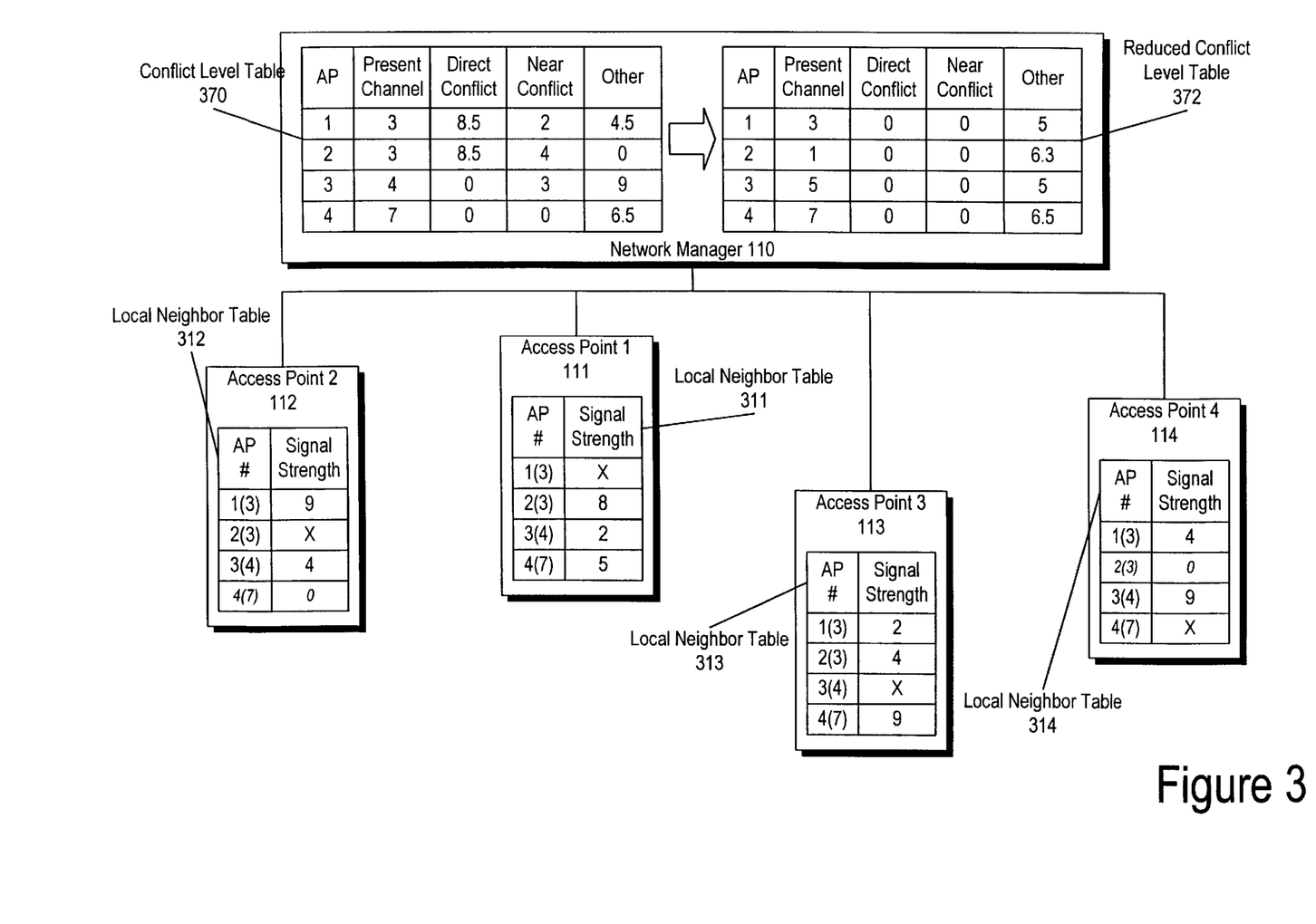
FIG. 3 illustrates the tables used to generate the new set of channel assignments.

FIG. 3 illustrates the tables used to generate the new set of channel assignments. The table format is illustrative of how the information from the access points can be represented but is not the only way of storing and organizing the information. For example, the information could be stored and organized as graphs, linked lists, or arrays. Each access point includes a local neighbor table. The local neighbor tables are generated from the step 210 up to the step 220. The access point 2 112 includes the local neighbor table 312. The access point 1 111 includes the local neighbor table 311. The access point 3 113 includes the local neighbor table 313. The access point 4 114 includes the local neighbor table 314.

Each local neighbor table includes the strength of any "I am here" messages, the identifier for the access point that transmitted the "I am here" message, and the channel upon which that message was received. For example, the local neighbor table 311 includes the following entries: for the access point 2 112, an "I am here" message 162 was received on channel three with a strength of eight; for the access point 3 113, an "I am here" message 163 was received on channel four with a strength of two; and for the access point 4 114, an "I am here" message 164 was received on channel seven with a strength of five. The following table lists the values of the received signal strengths, the channels and the access points.

TABLE 1

| Access Point 1 111 | | Access Point 2 112 | | Access Point 3 113 | | Access Point 4 114 | |
|---|---|---|---|---|---|---|---|
| AP # | Signal Strength | AP # | Signal Strength | AP # | Signal Strength | AP # | Signal Strength |
| 1(3) | X | 1(3) | 9 | 1(3) | 2 | 1(3) | 4 |
| 2(3) | 8 | 2(3) | X | 2(3) | 4 | 2(3) | 0 |
| 3(4) | 2 | 3(4) | 4 | 3(4) | X | 3(4) | 9 |
| 4(7) | 5 | 4(7) | 0 | 4(7) | 9 | 4(7) | X |

The channel is shown in parenthesis next to the access point identifier. The signal strength is shown on a relative scale from one to ten (ten being the maximum). For the purposes of illustration, an entry is shown for a message with a zero signal strength in the local neighbor tables for the access point 2 112 and the access point 4 114. In one embodiment, a zero signal strength means that no "I am here" message was detected by the access point. Therefore, the entry would not normally be included in that local neighbor tables.

From the local neighbor tables, the network manager 110 generates the conflict level table 370. The conflict level table 370 includes the total amount of direct conflict, near conflict and other signals received by an access point. Using the local neighbor tables above, the amount of direct conflict is 8.5 for the access point 1 111. This is the total signal strength of all the detected signals at the access point 1 111 from all the sources transmitting on the same channel as the access point 1 111 (e.g., access point 2 112 with a value of eight); and the detected signals at the other access points (e.g., access point 2 112 with a value of nine) from all the receivers of "I am here" messages from the access point 1 111 that are also using the same channel as the access point 1 111. Similar calculations are made for the other entries in the conflict level table 370.

After using the process of step 230, a new set of channel assignments is generated. In the example of FIG. 3, the reduced conflict level table 372 corresponds to the new channel assignments. Note that both the direct conflicts and the near conflicts have also been reduced to zero. Also note that only two access points need change their channels, thus, a relatively small disruption of the wireless communications network will occur.

Graphical User Interface

FIG. 4 illustrates a graphical user interface for displaying the levels of conflict between access points and for allowing a user to reassign channel assignments. In one embodiment, the network manager 110 displays the channel assignment display 400 in a window based user interface. The graphical user interface shown is an example of the type of interface that is presented to the user during the channel reassignment process. In another embodiment, the graphical user interface graphically shows the physical locations of the access points (e.g., as part of floor plan).

The channel assignment display 400 includes a number of graphical elements that help communicate the present status of the wireless LAN. Each graphical element includes text and/or an icon and/or some other graphics. The channel assignment display 400 includes: an access point identifier 420, a current channel 422 graphical element, a direct conflict indicator 427 graphical element, a near conflict indicator 428 graphical element, an other signal indicator 429 graphical element, a proximity indicator 426 graphical element, and a recommended channel 423 graphical element.

Each access point is represented in a list of access points by an access point identifier 420. The access point identifier includes the name of the access point and, optionally, an icon indicating the type of access point. Other information may also be displayed with the access point identifier 420. For example, a description of the physical location of the access point or notes describing special instructions when assigning channels to a given access point. The current channel 422 indicates the current channel being used by the corresponding access point.

The proximity indicator 426 includes a number of graphical elements that clearly and quickly show the network administrator where there are problems with interference between access points. A proximity indicator 426 is shown for each access point. The proximity indicator 426 indicates the detected signal strengths of the "I am here" messages received at a given access point. The proximity indicator 426, in one embodiment, is shown as a bar that is proportional to the detected signal strengths. The bar includes the direct conflict indicator 427, the near conflict indicator 428 and the other signals indicator 429. The direct conflict indicator 427 is proportional to the direct conflict value for an access point. The near conflict indicator 428 is proportional to the near conflict value for an access point. The other signal indicator 429 is proportional to the other signal values for an access point. In one embodiment, the direct conflict indicator 427 is shown as red, the near conflict indicator 428 is shown as yellow, and the other signal indicator 429 is shown as green. Thus, the network administrator can quickly see, by the amount of red showing, the present conflicts between access points.

The recommended channel 423 indicates which channel the access point should be assigned to in order to reduce the amount of conflict. The network administrator can change these recommended channel assignments (see step 250), if so desired. When the network administrator selects the "apply" button, the network manager 110 sends the new channel assignments to the access points (see step 260).

Optionally, the process of FIG. 2 can be repeated to generate a new channel assignment display 400 (after channel reassignment), as shown in FIG. 4. Note that the proximity indicator 426 now shows reduced conflicts. Alternatively, the channel assignment display 400 can be recalculated directly from the reduced conflict level table 372. In one embodiment, a graphical element is included in the channel assignment display 400 to display a before and an after snapshot of a proposed set of channel assignments.

In one embodiment, the channel assignment display 400, or some other graphical user interface, includes graphical elements for selecting a set of unusable channels for a given access point.

In one embodiment, the channel assignment display 400, or some other graphical user interface, includes graphical elements for fixing a specific access point on a specific channel. Thus, preventing the access point to be assigned a different channel.

A method and apparatus for maintaining non-interfering frequency assignments of wireless-based computer networking products has been described. The access points detect their neighboring access points and a proposed set of new channel assignments is generated that eliminates, or reduces, the conflict between access points, without requiring assistance from the network administrator. The results of the neighbor detection is graphically displayed to allow the network administrator to easily see the present status of the wireless network, given the present allocation of channels. The network administrator can then modify the proposed set of channel assignments. Finally, the new channel assignments are sent to the access points.

What is claimed is:

1. A network manager for reducing the amount of interference between access points communicating on a network, said network manager comprising:

a processor, coupled to communicate with a plurality of access points, for transmitting at least a first request message, said first request message for causing at least a first access point to determine a radio proximity of one or more neighbor access points of said first access point, said processor further for determining a set of channel assignments for said plurality of access points from at least said radio proximity, said set of channel assignments reducing an amount of interference in said radio proximity caused by a subset of said one or more neighbor access points communicating using a portion of the electromagnetic spectrum used by said first access point; and a memory, being coupled to said processor, for storing instructions and a value corresponding to said radio proximity for said processor.

2. The network manager of claim 1 wherein said processor is further for transmitting at least a second message, said second message being generated from said set of channel assignments, said second message for causing at least one access point of said plurality of access points to change channels.

3. The network manager of claim 1 further comprising a display device, being coupled to said processor, and wherein said processor is further for causing a display of a graphical representation of said radio proximity.

4. The network manager of claim 1 wherein said processor is further for processing at least a first message received from said first access point, said first message indicating said radio proximity for said first access point.

\* \* \* \* \*